United States Patent
Ng et al.

(10) Patent No.: US 10,366,201 B1
(45) Date of Patent: Jul. 30, 2019

(54) TIMING CLOSURE OF CIRCUIT DESIGNS FOR INTEGRATED CIRCUITS

(71) Applicant: Xilinx, Inc., San Jose, CA (US)

(72) Inventors: Aaron Ng, San Jose, CA (US); Sridhar Krishnamurthy, San Jose, CA (US); Grigor S. Gasparyan, San Jose, CA (US)

(73) Assignee: XILINX, INC., San Jose, CA (US)

( * ) Notice: Subject to any disclaimer, the term of this patent is extended or adjusted under 35 U.S.C. 154(b) by 6 days.

(21) Appl. No.: 15/495,760

(22) Filed: Apr. 24, 2017

(51) Int. Cl.
 *G06F 9/455* (2018.01)
 *G06F 17/50* (2006.01)

(52) U.S. Cl.
 CPC ...... *G06F 17/5081* (2013.01); *G06F 2217/06* (2013.01)

(58) Field of Classification Search
 USPC .................................................. 716/110–117
 See application file for complete search history.

(56) References Cited

U.S. PATENT DOCUMENTS

| 2010/0058260 A1* | 3/2010 | Correale, Jr. ....... G06F 17/5068 716/106 |
| 2011/0131544 A1* | 6/2011 | Majumder .......... G06F 17/5086 716/139 |
| 2015/0026653 A1* | 1/2015 | Stevens ................. G06F 17/505 716/108 |

\* cited by examiner

*Primary Examiner* — Binh C Tat
(74) *Attorney, Agent, or Firm* — Kevin T. Cuenot

(57) ABSTRACT

Closing timing for a circuit design can include displaying, using a display device, a first region having a plurality of controls corresponding to a plurality of data sets generated at different times during a phase of a design flow for a circuit design, wherein each control selects a data set associated with the control, and displaying, using the display device, a second region configured to display a list of critical paths for data sets selected from the first region using one of the plurality of controls. Closing timing further can include displaying, using the display device, a third region configured to display a representation of a target integrated circuit including layouts for the critical paths of the list for implementations of the circuit design specified by the selected data sets.

20 Claims, 6 Drawing Sheets

300

Display first region of GUI including snapshot controls for selecting data sets
305

↓

Display second region of GUI including a list of critical paths for a selected data set
310

↓

Display third region of GUI including view of an implementation of the circuit design
315

| | | | | |
|---|---|---|---|---|
| 1 | -1.037 | FDPE | | FIFO18E2 |
| 2 | -0.904 | FDPE | | FIFO18E2 |
| 3 | -0.843 | FIFO18E2 | L6 | FDRE |
| 4 | -0.843 | FIFO18E2 | L6 | FDRE |
| 5 | -0.843 | FIFO18E2 | L6 | FDRE |
| 6 | -0.789 | FDPE | | FDCE |

702

TIMING CLOSURE OF CIRCUIT DESIGNS FOR INTEGRATED CIRCUITS

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to integrated circuits (ICs) and, more particularly, to electronic design automation (EDA) tools that facilitate timing closure for implementing circuit designs within ICs.

BACKGROUND

EDA tools implement a circuit design within an IC by performing a variety of operations on the circuit design. These operations are typically referred to as a "design flow." In general, a design flow is organized into multiple phases such as synthesis, placement, and routing. The EDA tool ordinarily generates a comprehensive timing report at the conclusion of each phase.

In cases where the EDA tool is unable to close timing or complete the design flow for a given circuit design, designers rely upon the timing reports generated at the conclusion of each phase of the design flow for purposes of troubleshooting the circuit design. Though helpful, the timing reports are limited to showing the final results achieved by a given phase. Each phase of the design flow, however, is a significant undertaking involving many complex and/or iterative operations.

SUMMARY

One or more embodiments are directed to systems and/or apparatus for closing timing for a circuit design. In one aspect, a system includes a display device. The display device displays and/or includes a first region having a plurality of controls corresponding to a plurality of data sets generated at different times during a phase of a design flow for a circuit design, wherein each control selects a data set associated with the control. The display device can display and/or include a second region configured to display a list of critical paths for data sets selected from the first region using one of the plurality of controls. The display device can display and/or include a third region configured to display a representation of a target integrated circuit including layouts for the critical paths of the list for implementations of the circuit design specified by the selected data sets.

One or more embodiments are directed to computer-implemented methods of closing timing for a circuit design. In one aspect, a method can include displaying, using a display device, a first region having a plurality of controls corresponding to a plurality of data sets generated at different times during a phase of a design flow for a circuit design, wherein each control selects a data set associated with the control, and displaying, using the display device, a second region configured to display a list of critical paths for data sets selected from the first region using one of the plurality of controls. The method can also include displaying, using the display device, a third region configured to display a representation of a target integrated circuit including layouts for the critical paths of the list for implementations of the circuit design specified by the selected data sets.

One or more embodiments are directed to computer program products for closing timing of a circuit design. In one aspect, a computer program product includes a computer readable storage medium having program code stored thereon. The program code is executable by a processor to perform operations including displaying, using a display device, a first region having a plurality of controls corresponding to a plurality of data sets generated at different times during a phase of a design flow for a circuit design, wherein each control selects a data set associated with the control, and displaying, using the display device, a second region configured to display a list of critical paths for data sets selected from the first region using one of the plurality of controls. The program code is further executable by the processor to perform operations including displaying, using the display device, a third region configured to display a representation of a target integrated circuit including layouts for the critical paths of the list for implementations of the circuit design specified by the selected data sets.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
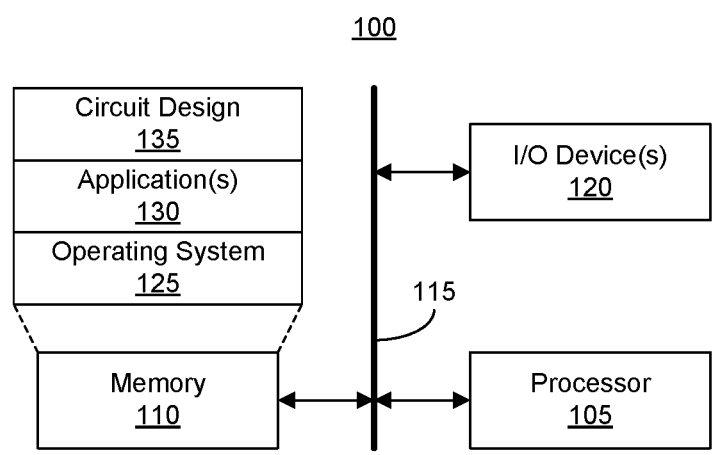
FIG. 1 illustrates an example of a data processing system for use with one or more embodiments described herein.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to electronic design automation (EDA) tools that facilitate timing closure for implementing circuit designs within ICs. Example embodiments described within this disclosure are directed to generating data sets for multiple, different points within a design flow. As a circuit design undergoes processing through the design flow, data relating to timing of the circuit design is generated and stored for a variety of different operations across one or more phases of the design flow. Thus, data is generated for multiple, different implementation states of the circuit design within multiple, different phases of the design flow as opposed to generating a final timing report at the close of a given phase of the design flow. For example, within a given phase of the design flow such as placement, a data set is generated after performing each of a plurality of different operations that are part of the placement phase. The data is stored within a data storage device for subsequent use, rendering, and/or analysis.

The data sets may be rendered within a graphical user interface (GUI) of a system. The system, for example, in response to a user selection of a phase of the design flow and an operation within the selected phase, renders the data set generated by the selected operation within the GUI. Since the operations of a given phase are performed in a set order, viewing the data sets within the GUI illustrates how implementation of the circuit design for a given target IC evolves as the circuit design is processed through the design flow. As an illustrative and non-limiting example, the system is capable of determining and showing not only timing criticality of paths, but also when within a given phase the path became critical and/or when the path started meeting timing requirements. In effect, the system provides a time-line view of the implementation states of the circuit design through the design flow and supports navigation through the time-line in the forward and/or reverse directions with respect to time.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example of a data processing system (system) 100 for use with one or more embodiments described herein. System 100 includes at least one processor 105, e.g., a central processing unit (CPU). Processor 105 is coupled to memory 110 through interface circuitry 115. System 100 stores computer readable instructions (also referred to as "program code") within memory 110. Memory 110 may be considered an example of computer readable storage media. Processor 105 executes the program code accessed from memory 110 via interface circuitry 115. In an aspect, system 100 is implemented as a computer or other system or device that is suitable for storing and/or executing program code.

Memory 110 includes one or more physical memory devices such as, for example, a local memory and one or more bulk storage devices. The term "local memory" refers to random access memory (RAM) or other non-persistent memory device(s) generally used during actual execution of the program code. The term "bulk storage device" refers to persistent data storage devices such as a hard disk drive (HDD), solid state drive (SSD), etc. System 100 may also include one or more cache memories (not shown) that provide temporary storage of at least some program code in order to reduce the number of times program code must be retrieved from a bulk storage device during execution.

Examples of interface circuitry 115 include, but are not limited to, an input/output (I/O) subsystem, an I/O interface, a bus system, a memory interface, etc. For example, interface circuitry 115 may be one or more of any of several types of bus structures, including a memory bus or memory controller, a peripheral bus, an accelerated graphics port, and a processor or local bus using any of a variety of bus architectures. By way of example, and not limitation, such bus architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

System 100 further may include one or more input/output (I/O) devices 120 coupled to interface circuitry 115. I/O devices 120 may be coupled to system 100, e.g., interface circuitry 115, either directly or through intervening I/O controllers. Examples of I/O devices 120 include, but are not limited to, a keyboard, a display device (e.g., monitor, screen, etc.), a pointing device, one or more communication ports, a network adapter, etc. A network adapter refers to circuitry that enables system 100 to become coupled to other systems, computer systems, remote printers, and/or remote storage devices through intervening private or public networks. Modems, cable modems, Ethernet cards, and wireless transceivers are examples of different types of network adapters that may be used with system 100.

Memory 110 stores one or more program modules. The program modules may generally include routines, programs, objects, components, logic, data structures, and so on. For purposes of illustration, memory 110 stores an operating system 125, one or more application(s) 130, and data such as a circuit design 135. In one or more embodiments, application(s) 130 include an EDA application. The EDA application is capable of performing a design flow on circuit design 135 as described herein in greater detail.

In one or more embodiments, application(s) 130 include an application configured to perform operations described herein for presenting data sets of timing data. The application, for example, is capable of generating one or more GUIs as described herein for displaying, on a display device, data sets from different operations throughout a design flow performed on a circuit design such as circuit design 135. In an example, the application may be, or include, a browser implementation, e.g., a Web browser, to be described herein in greater detail.

In an aspect, operating system 125 and application(s) 130, being implemented in the form of executable program code, are executed by system 100 and, more particularly, by processor 105, to perform the operations described within this disclosure. As such, operating system 125 and application(s) 130 may be considered an integrated part of system 100. Further, it should be appreciated that any data used, generated, and/or operated upon by system 100 (e.g., processor 105) are functional data structures that impart functionality when employed as part of the system.

System 100 may include fewer components than shown or additional components not illustrated in FIG. 1 depending upon the particular type of device and/or system that is implemented. In addition, the particular operating system and/or application(s) included may vary according to device and/or system type as may the types of I/O devices included. Further, one or more of the illustrative components may be incorporated into, or otherwise form a portion of, another component. For example, a processor may include at least some memory.

Figure 2:
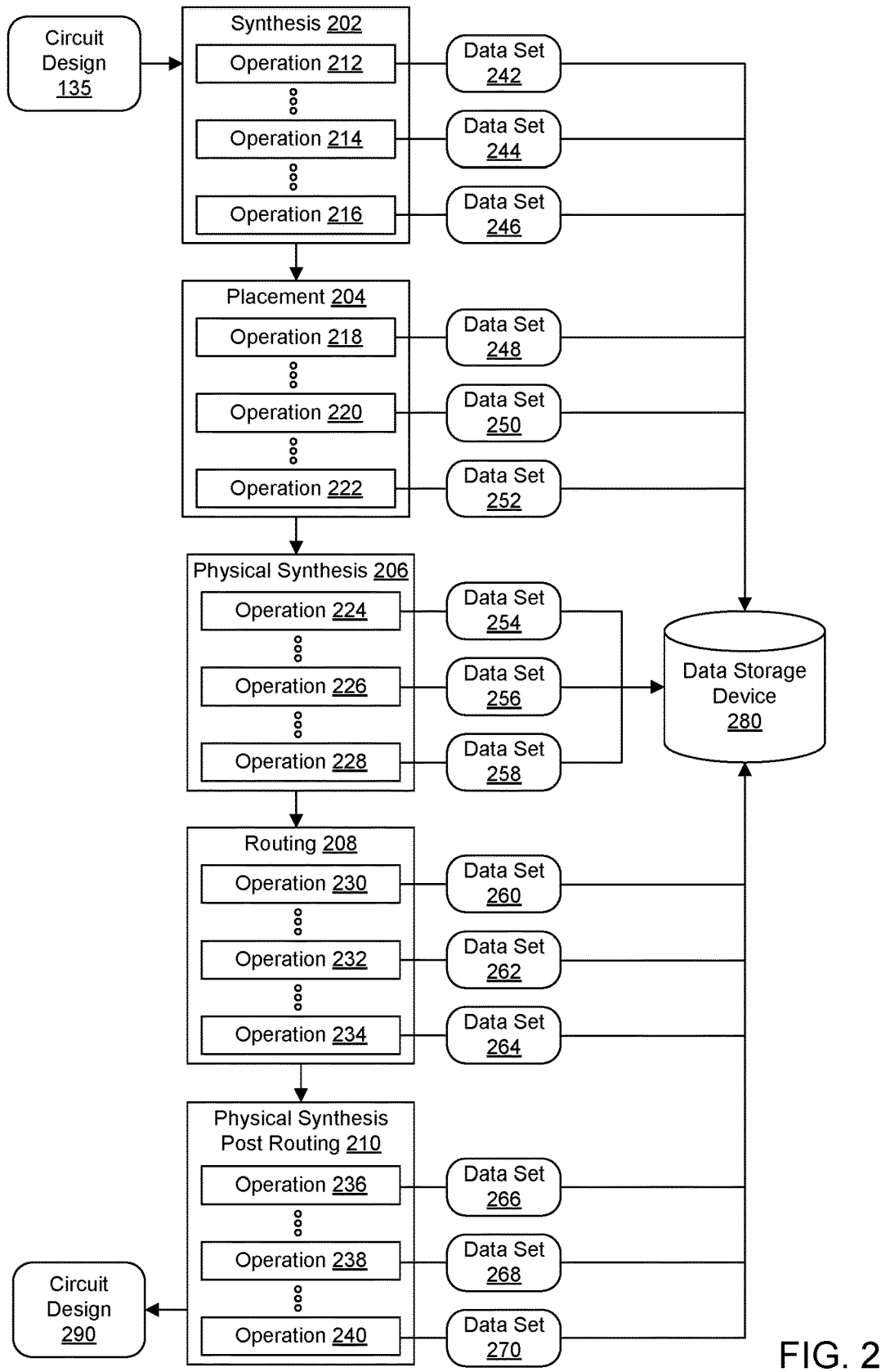
FIG. 2 illustrates an example of data set generation during a design flow for implementing a circuit design within an IC.

FIG. 2 illustrates an example of data set generation during a design flow for implementing a circuit design within an IC. The design flow shown in FIG. 2 may be performed by a system the same as or similar to the system described in connection with FIG. 1. The example design flow shown in FIG. 2 includes phases such as synthesis 202, placement 204, physical synthesis 206, routing 208, and physical synthesis post routing 210. The system may process circuit design 135 through the design flow to generate a placed and routed version of circuit design 135 shown as circuit design 290. Circuit design 290, for example, may be configured for implementation within an IC. In an embodiment, the IC is a programmable IC, e.g., a field programmable gate array (FPGA).

For purposes of illustration, each of synthesis 202, placement 204, physical synthesis 206, routing 208, and physical synthesis post routing 210 (e.g., phases) includes a plurality of operations. As pictured, synthesis 202 includes a plurality of operations 212, 214, and 216. Placement 204 includes a plurality of operations 218, 220, and 222. Physical synthesis 206 includes a plurality of operations 224, 226, and 228. Routing 208 includes a plurality of operations 230, 232, and 234. Physical synthesis post routing 210 includes a plurality of operations 236, 238, and 240.

For example, within an EDA tool, placement 204 may perform operations (and/or multiple iterations of such operations) such as partitioning, incremental macro placement, global placement, global and regional clock placement, iterative local refinement, shape legalization, path optimization, and so forth. Each of these operations and iterations of an operation is represented within the various phases (e.g., operations 218, 220, and 222 in the case of placement 204).

In one or more embodiments, a system such as system 100 has a parameter that, when enabled, causes the system to output data during implementation of a design flow as shown. For example, the parameter may be a TCL parameter that may be set by a user. When performing a design flow on a circuit design with the data collection parameter enabled, the operations of the phases of the design flow are configured to generate data sets that are output and stored in data storage device 280. In one example, when the data collection parameter is enabled, operations of phases (e.g., synthesis 202, placement 204, physical synthesis 206, routing 208, and/or physical synthesis post routing 210) are configured to call a data collection class through an application programming interface (API). The data collection class collects timing information that is output as a data set for the state of implementation of the circuit design after performance of each respective operation 212-240.

In an embodiment, only selected ones of the operations of the phases (e.g., synthesis 202, placement 204, physical synthesis 206, routing 208, and/or physical synthesis post routing 210) are configured to output data sets. For example, a phase may include a large number of operations. One or more of the operations may be iteratively performed. Thus, in one or more embodiments, only selected ones of the operations and/or selected iterations of certain operations are configured to output data sets. For example, only a subset of the operations of a given phase may be configured to output data as shown.

For purposes of illustration, referring to synthesis 202, operation 212 generates data set 242; operation 214 generates data set 244; and operation 216 generates data set 246. Referring to placement 204, operation 218 generates data set 248; operation 220 generates data set 250; and operation 222 generates data set 252. Referring to physical synthesis 206, operation 224 generates data set 254; operation 226 generates data set 256; and operation 228 generates data set 258. Referring to routing 208, operation 230 generates data set 260; operation 232 generates data set 262; and operation 234 generates data set 264. Referring to physical synthesis post routing 210, operation 236 generates data set 266; operation 238 generates data set 268; and operation 240 generates data set 270.

It should be appreciated that while only three operations are shown to output data sets for each phase, the number of operations configured to output data sets in each respective phase may be smaller or larger. In some examples, approximately 15-32 operations are configured to output data sets in a given phase. Further, the number of operations that are configured to output data sets in one phase may differ from the number of operations that are configured to output data sets in another, different phase. In addition, the particular phases described are for purposes of illustration. A design flow may have fewer or more phases than shown.

Each of data sets 242-270 may include a variety of information types as collected by the data collection class. Examples of the types of information that may be included in each of data sets 242-270 can include, but are not limited to:

The top "N" timing critical paths of the circuit design, where "N" is an integer value.

The path nets (e.g., nodes) of each timing critical path.

Slack, timing requirement, path group, and skew for each timing critical path. The "N" timing critical paths and/or timing information may be generated by one or more timers of the EDA tool, whether a slower and more accurate timer or a faster timer that provides less accurate timing information.

Driver pin type, load pin type, and delay for each net of a timing critical path.

Path pin types which are saved as "Path DNA" to consolidate timing critical paths into similar sets of paths. For example, for the path FF→LUT6→LUT5→FF, the system may store the path and also a path DNA of "FF→FF". The path DNA may be used to identify systemic problems in the EDA tool or phase.

Paths selected for tracking, e.g., by the user (which may include non-timing critical paths).

Placement locations of pin instances.

Names of timing critical instances and pins for purposes of correlating the instances (e.g., circuit elements) with a timing report.

Area constraints/pblocks that are active on the circuit design.

The convex hull of all critical paths. For example, the system stores each Y-hop driver and load from each pin on each timing critical path (where "Y" is an integer value of 1, 2, 3, etc.).

Maps showing resource utilization. For example, density maps for illustrating placed instances of circuit elements, horizontal and/or vertical smear maps showing routing congestion, and control set density maps.

The core boundary to denote the implementation region (e.g., portion of programmable circuitry needed or used to implement the core or other portions of a circuit design vs. the portions that are not used).

Boundaries illustrating super-logic regions (SLRs) which are dies in multi-die ICs.

Regions of the IC with high power utilization (e.g., high switching activity)

The term "control set" refers to two or more control pins of two or more different circuit components that are of a same control pin type and that are driven by a same control signal or a same instance of a driver circuit component. A control set can be a unique set of control and/or clock paths for sequential circuit components such as flip-flops, latches, slice RAMs, and so forth. Two circuit components are in a same "control set" when each of the two circuit components has same control pin types (e.g., set, reset, clock enable, clear) that are driven by same signals and/or a same driver circuit components (e.g., different instances of a same circuit component).

In an embodiment, data sets 242-270 include one or more of the above-described data items, e.g., a combination of one or more of the above data items. In another embodiment, each of data sets 242-270 includes each of the above-described data items. Each of data sets 242-270 represents a particular or unique state of implementation of circuit design 135. Each of data sets 242-270, for example, represents a particular state of implementation of circuit design 135 that exists at a different time, e.g., after performing a particular operation or a particular iteration of an operation during the design flow. Further, subsets of data sets, e.g., data sets 242-246, generated during a same phase of the design flow represent different states of the circuit design at different times during that phase.

In an embodiment, each of data sets 242-270 is stored as a separate file. Throughout this disclosure, a data set file may be referred to as a "snapshot." In an aspect, the files used to store the data sets may be text files. In one example, each of data sets 242-270 is stored as a JavaScript Object Notation (JSON) file. For example, each data set may be stored as a JSON formatted file and named using the phase and/or operation being performed. The operation may include an iteration number as part of the naming. Thus, the data collection class invoked by each process to generate or output the data set is configured to generate JSON formatted files.

In an embodiment, the data collection class is configured to append each data set file to an index file (e.g., an "index.json" file). Using an index file with other data set files (e.g., other JSON formatted files) appended thereto allows a system, e.g., a client system, to open the index file thereby reducing the history of the design flow to a manageable form and size while still allowing the client system to navigate to any snapshot appended to the index file. In this regard, the client system may navigate forward in time or backward in time through selection of a particular phase and data set (or operation) for the phase.

Using a format such as JSON facilitates use of the data sets as many computing platforms have native or "built-in" encode/decode support for JSON. Thus, many data processing systems are capable of using JSON files and displaying content of the JSON files using a GUI that requires no installation of additional program code. For example, a browser (e.g. a Web browser) is capable of displaying content of the JSON files. Moreover, JSON is human readable.

In one or more embodiments, a GUI for use in rendering the data sets may be generated by a browser. The browser, for example, may access a Web page. The Web page includes a reference to the index file described above and also a GUI component. In one example, the GUI component is written in a scripting language such as JavaScript. JavaScript, for example, provides native support for JSON. For example, the Web page and any components referenced by the Web page may be stored and/or hosted on a server. In one or more embodiments, the server may be a Hypertext Transfer Protocol (HTTP) server or HTTP Secure (HTTPS) server. For example, the Web page is configured to call the JavaScript, which in turn is capable of generating the regions (panes) shown in FIGS. 4-9 on a display device.

The example embodiments described within this disclosure are not intended to be limited to using one particular format or syntax for data storage. In one or more embodiments, data sets may be stored using any of a variety of different serialization interchange formats, binary formats, etc. Further, the example embodiments are not intended to be limited to one particular GUI implementation technology. In one or more embodiments, different scripting languages may be used. In one or more other embodiments, the GUI may be implemented as a stand-alone GUI application for desktop computers, mobile devices, client devices, etc. Accordingly, the examples provided herein are for purposes of illustration and are not intended to limit the inventive arrangements to any particular data structure and/or file format.

The term "slack" refers to the difference between a required arrival time of a signal at a circuit element, e.g., a signal arriving at a load of a path from the source, and an estimated arrival time of the signal at the circuit element. A positive slack "s" indicates that the path meets the timing requirement, or timing constraint, for the path. In that case, the delay of the path may be increased by "s" without increasing the overall delay of the circuit design. A negative slack "s" indicates that the path does not meet the timing requirement for the path. The path is slower than the requirement for the path. The estimated arrival time of a signal to the load of the path is after the required arrival time (e.g., the requirement). Accordingly, a "critical" or "timing critical" path refers to a path that has a negative slack.

The term "path" refers to a connection, e.g., wires configured to physically convey signals, between at least two endpoints. Each endpoint of the path is a synchronous, or clocked, circuit element. One or more combinatorial, or un-clocked, circuit elements may be in the path. A path may be formed by a connection between a source and one or more loads of the source of a path. In one example embodiment, sequential circuit elements are synchronous circuit elements. The term "net" refers to a portion of a path that starts with one node (e.g., circuit element or circuit block) of the path and ends at another node of the path, where one or both nodes are not the endpoints. Whereas a path has a clocked starting node and a clocked ending node (e.g., clocked endpoints), a net of the path may have a clocked starting node and an un-clocked ending node, an un-clocked starting node and an un-clocked ending node, or an un-clocked starting node and a clocked ending node.

Figure 3:
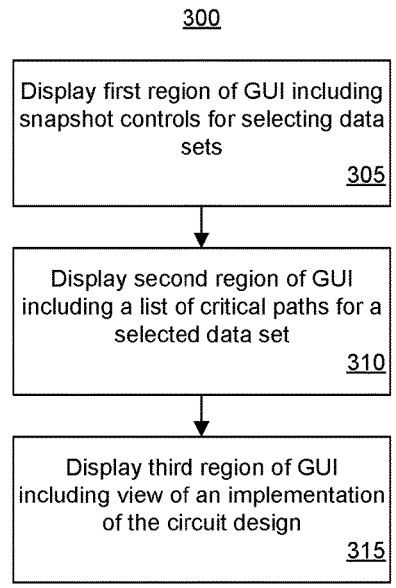
FIG. 3 illustrates an example method of closing timing for a circuit design.

FIG. 3 illustrates an example method 300 of timing closure for a circuit design. Method 300 may be performed by a system the same as or similar to the system described in connection with FIG. 1. Further, method 300 may begin in a state where data sets have been generated from performing a design flow on a circuit design as described with reference to FIG. 2. For purposes of illustration, a particular phase of the design flow is selected.

In block 305, the system displays, on a display device, a first region of a GUI. The first region of the GUI may include a plurality of snapshot controls for the particular phase of the design flow that is selected. The snapshot controls correspond to the data sets generated by the design flow for the circuit design. For example, the system may generate and display one snapshot control for each snapshot of the selected phase of the design flow. Each snapshot control is configured to select and open a data set generated for one of the operations of the phase.

In block 310, the system displays, on the display device, a second region of the GUI. The second region of the GUI may display a list of critical paths for data sets that are selected from the first region using one of the plurality of snapshot controls. For example, in response to a user selection of a particular snapshot control, the data set associated with the selected snapshot control is loaded into memory and rendered within the GUI. Accordingly, the critical paths specified by the data set are listed in the second region of the GUI.

In block 315, the system displays, on the display device, a third region of the GUI. The third region of the GUI is configured to display a view of an implementation of the circuit design. The implementation of the circuit design is displayed within, e.g., overlaid, on a physical representation of the IC. The view of the implementation, for example, shows the current state of implementation of the circuit design, e.g., placement of critical paths from the list displayed in the second region of the GUI, for the selected snapshot.

Figure 4:
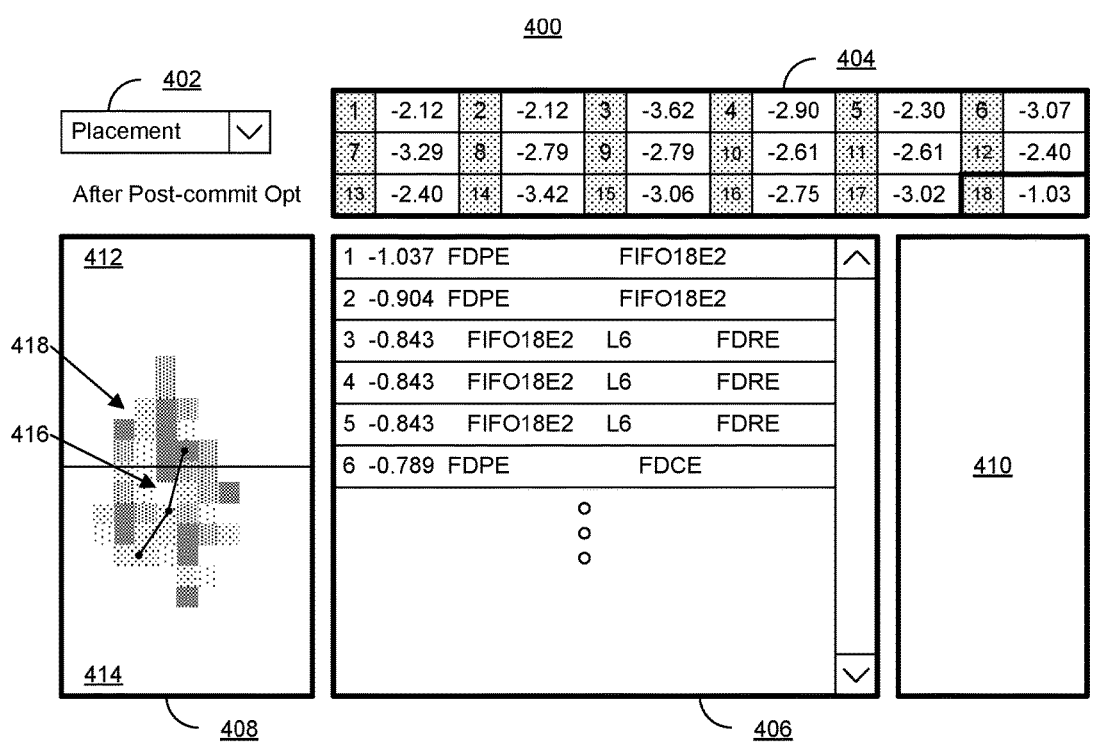
FIG. 4 illustrates an example graphical user interface (GUI).

FIG. 4 illustrates an example GUI 400. GUI 400 is generated by a system the same as or similar to the system described in connection with FIG. 1. It should be appreciated that the system that generates GUI 400 need not be the same system that implemented the design flow. In an embodiment, GUI 400 is displayed, or generated, by a browser as described. For example, a user may execute a browser on the system and navigate to a Web page. The Web page and programs and/or data referenced by the Web page may be stored on a computer system that is remotely located from the system accessing the Web page and rendering the GUI. Rendering of the Web page, at least in part, generates GUI 400. As discussed, however, in another embodiment, GUI 400 is displayed, or generated, by a stand-alone application on the accessing system.

As pictured, GUI 400 has a phase selector control 402. Phase selector control 402 is configured to receive user inputs selecting a particular phase of a design flow for a circuit design. In an embodiment, the selections available within phase selector control 402 are specified by the loaded Web page. For purposes of illustration, phases such as synthesis, placement, physical synthesis, routing, and/or physical synthesis post routing may be selected. These phases, for example, may be provided as selectable items in a drop down menu in response to selecting phase selector control 402. Any phases available from phase selector control 402 are phases for which at least one snapshot is available.

While the disclosure describes five general phases of a design flow, it should be appreciated that the particular number of phases is not limited by the examples provided.

An example list of phases of a design flow is shown below, where multiple data sets (or snapshots) may be collected for each such phase.

Before Partitioner
After Partitioner
Global Macro Placement
Incremental Macro Placement
After each Global Placement timing-update iteration
Clock Region Placement
Late Stage Global Placement
Discrete Placer: Area Legalization
Discrete Placer: Enforce Shapes
Discrete Placer: Big Shape Swap Optimization
Small Shapes Clustering
Small Shape Legalization
Small Shapes Commit
Small Shapes Commit
Physical Synthesis Initialization
Physical Synthesis Replace
Physical Synthesis Rewire
Physical Synthesis Pin Swap
Physical Synthesis Fanout Optimization
Physical Synthesis Very-high Fanout Optimization
Physical Synthesis Critical Cell Optimization (replication)
Physical Synthesis BRAM/DSP/SRL Optimization In the example of FIG. 4, the placement phase of the design flow for the circuit design is selected. In response to a selection of a particular phase, the information presented in region 404 updates. For example, in response to selecting a particular phase of the design flow for a given circuit design, region 404 updates to display a snapshot control corresponding to each data set file (e.g., snapshot) generated for the selected phase. Information in regions 406, 408, and 410 may also update, be cleared, or initialized based upon a user selection of a phase using phase selector control 402.

In the example of FIG. 4, in response to selecting "placement" using phase selector control 402, region 404 displays a plurality of snapshot controls 1-18. In the example of FIG. 4, the placement phase has 18 snapshots. In particular, during the placement phase, 18 different data set files were generated and output from 18 of the total number of operations performed for the placement phase. These different data set files are available and selectable using the snapshot controls in region 404. To the right of the snapshot control number is another numeric value. The numeric value to the right of the snapshot control number indicates the worst negative slack of a path in the data set file for the snapshot control. For example, subsequent to performing the placement operation corresponding to snapshot control 1, the data set file corresponding to snapshot control 1 includes one or more timing critical paths with the worst of the timing critical paths having a slack of −2.12. For purposes of discussion, the times may be specified in nanoseconds. Thus, the snapshot control can display a snapshot control number or identifier (ID) and the worst slack of a path from that snapshot.

Within region 404, the user has selected snapshot control 18 corresponding to a data set having a worst negative slack of −2.51. In response to selecting snapshot control 18, the views presented within each of regions 408 and 406 are updated with data from the data set file associated with snapshot control 18. In addition, the verbiage below phase selector control 402 is updated to specify the particular operation of placement that generated the selected snapshot. In this example, snapshot control 18 corresponds to an operation called "after post-commit opt" that is performed as part of the placement phase. The state of the circuit design subsequent to performing "after-post-commit opt" is shown, at least in part, in region 406 and in region 408.

Region 406 is configured to display a list of timing critical paths of the circuit design for the selected snapshot. In the example of FIG. 4, region 406 displays the N paths of snapshot 18 having the worst negative slack (e.g., the N most timing critical paths). In one example, N may be set equal to 50 or another value. In an embodiment, the value of N may be a user configurable parameter. In an embodiment, the list displayed in region 406 is configured to display each timing critical path of the circuit design for the selected snapshot. In the example of FIG. 4, only 6 paths are shown in region 406 for purposes of illustration. The paths of region 406 may be sorted. As pictured, the paths of region 406 are sorted so that the path with the worst negative slack is located at the top of the list. In an embodiment, sorting controls may be displayed in region 406 allowing the user to select whether paths are sorted with increasing or decreasing slack.

Each row in region 406 represents a path. The leftmost value is an identifier from 1 to N. Each path listed in region 406 is also displayed in region 408. For purposes of illustration, however, only one path is depicted in region 408. The next value moving to the right in a row is the slack of the path. Following the slack is a list of nodes of the path. Each node is represented using the name of the circuit element that implements that node in order from the source to the load. For example, path 1 has a negative slack of −1.037. The first node, which is a source, is an FDPE. The second node, which is the load, is a FIFO18E2. Path 1 has a single net. Path 3, for example, as a first net starting at node FIFO18E2 and ending at node L6 and a second net starting at node L6 and ending at node FDRE.

In an embodiment, the spacing between nodes in each row in region 406 shows the proportion of the delay of the path that is attributable to the net defined by the nodes. For example, referring to row 3, one can see that the net defined by L6 and FDRE is responsible for a greater portion of the −0.843 slack of the path than the net defined by FIFO18E2 and L6. An even or same spacing between nodes indicates, for example, that each net generally has a same amount of delay and contributes equally to the overall path delay.

Region 408 is capable of displaying each path listed in region 406. Region 408 includes a representation of the IC in which the circuit design is to be implemented (e.g., the target IC). Region 408 further includes, or displays, a physical layout for the implementation of the paths (e.g., each path) listed in region 406 for the selected snapshot. For example, path 416 is shown in region 408. Path 416 represents the implementation, e.g., a physical layout in this example, of the path of row 3 in region 406. It should be appreciated that only path 416 is shown for clarity and ease of illustration. Region 408 is capable of displaying each, or any, path in the list of critical paths from region 406. Each path displayed in region 408 is displayed as that path exists per the current implementation of the circuit design after performing the operation selected from region 404. In this example, the layout of path 416 is shown in region 408 as that path exists after performing "after post-commit opt."

In the example of FIG. 4, the target IC includes two dies 412, 414, each including programmable circuitry. Path 416 is shown as placed after performing the selected operation in the placement phase, e.g., operation 18. Thus, region 408 shows the physical locations of the nodes of the paths listed in region 406 on the target IC. The example of FIG. 4 illustrates that path 416 crosses from die (e.g., SLR) 414 to die (e.g., SLR) 412. The net that crosses from die 414 to die 412 corresponds to the net from L6 to FDRE. The cross die route typically requires greater time, which is reflected in the spacing between nodes L6 and FDRE in row 3 (showing that net accounts for more of the delay of the path than the net from FIFO18E2 to L6).

In an embodiment, regions 406, 408, and/or 410 are linked and are interactive. For example, selecting an object in region 408 causes the selected object(s) in region 408 and in region 406 to be visually highlighted or distinguished from other non-selected objects. Similarly, selecting an object in region 406 causes the selected object(s) in region 406 and in region 408 to be visually highlighted or distinguished from other non-selected objects.

Referring to region 408, visual coding is applied to the paths shown to indicate different timing related characteristics of the paths. For example, the nodes of the path may be represented using dots or circles. Different colors may be used to represent different types of nodes such as look-up tables, flip-flops, DSPs, block RAMs, etc. The lines, e.g., wires, connecting the nodes may also be color coded. In one aspect, the color coding of wires indicates the degree of timing criticality. For example, those paths with more negative slack may be represented using brighter shades of red, thicker lines, and/or both compared to paths with less negative slack shown in region 408.

In addition to the data already described, in one or more embodiments, region 408 is configured to display a variety of data as a map. The maps may illustrate resource utilization of the circuit design for the selected phase and operation. The maps illustrate usage of various hardware resources of the target IC by the circuit design at the selected point in time during the implementation flow of the circuit design.

Referring to region 408, the gray shaded blocks, taken collectively, illustrate a map 418 displayed in combination with the paths listed in region 406. In the example of FIG. 4, map 418 in region 408 illustrates resource utilization for one or more selected resources. The resources may be circuit elements and/or circuit blocks of a programmable IC. The user, for example, may select one or more resources (e.g., circuit elements including wires) to be displayed as map 418 within region 408. Map 418, e.g., a resource utilization map, is used as a background of region 408, with the critical paths displayed or superimposed (overlaid) on the background. Examples of different types of utilization that may be selected and displayed include, but are not limited to, flip-flop utilization, look-up table utilization, vertical or horizontal routing congestion, control set density, etc. The selected shading shown in FIG. 4 is flip-flop utilization where darker shaded cells indicates higher flip-flop utilization compared to lighter colored cells indicating lower levels of flip-flop utilization. The mapping illustrates various forms of congestion on the IC relative to the placement of the critical paths.

Region 410 is an information window capable of providing detailed information relating to timing, node names, and the like for a given selected path whether selected from region 408 and/or 406. For example, selecting a path from either region 406 or region 408 causes the system to display the timing report for the selected path within region 410 for the currently selected snapshot. Example 1 below illustrates an example of a timing report that may be displayed in region 410 for a selected path.

Example 1

Slack: −0.842 ns
Requirement: 1.769 ns

RAMB18E2-5.56 2 CORE_INST/INTERFACE_INST/ . . .
LUT5 0.46 6.02 2 CORE_INST/INTERFACE_INST/ . . .
SRL16E 0.43 6.46 CORE_INST/INTERFACE_INST/ . . .

For example, the timing report of Example 1 may be for a path shown in region 410. The timing report of Example 1 can include the slack, the timing requirement for the path, each node of the path (first column), a delay for each net of the path (second column), cumulative delays of the nets for the path (third column), fan-out (fourth column), and exact node names for each node (fifth column). Fan-out is an example piece of information that aids in closing timing. Critical paths often have high fan-out. The farthest load(s) from the source tend to be timing critical.

In one or more embodiments, data sets are loaded into memory and displayed as needed or "on demand." For example, rather than loading more than one data set into memory at a time, data sets may be loaded by the system on demand, e.g., one data set at a time. In an example, the system only loads a data set into memory and displays aspects of that data set in regions 406, 408, and/or 410 in response to a user selection of the control for that data set. For example, the data displayed in regions 406, 408, and 410 (corresponding to snapshot 18) may be displayed only in response to a user selection of snapshot control 18. Further, selection of a control for a data set may cause the system to unload any other data set previously loaded into memory. By loading data sets on demand, e.g., as requested, the system reduces the amount of memory resources needed during runtime operation.

Figure 5:
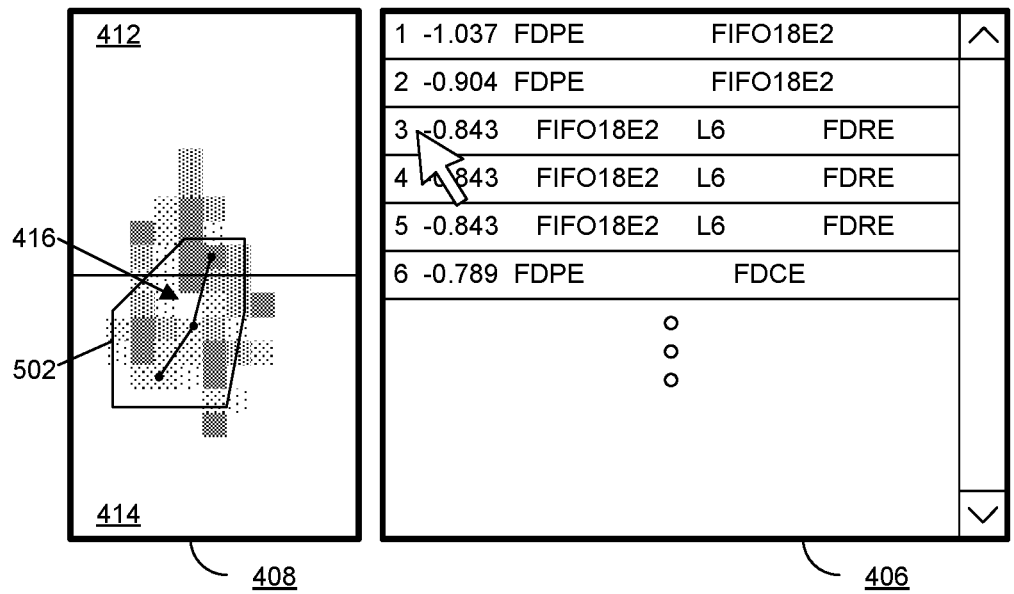
FIG. 5 illustrates regions of the example GUI of FIG. 4 in a different state.

FIG. 5 illustrates regions 406 and 408 of example GUI 400 in a different state. In the example of FIG. 5, a user, using a pointer or other selection mechanism, selects row 3 in region 406 corresponding to path 416. In one aspect, in response to selecting row 3, path 416 is visually distinguished from other paths. For example, the coloration of path 416 as pictured in region 408 may be changed, made to flash, or the like. As an illustrative example, the nodes of path 416 may be color coded to indicate the particular types of circuit elements being represented while the lines (e.g., wires) connecting the nodes are shown in red. In response to being selected, the wires of path 416 may be changed to blue to visually distinguish path 416 from other critical paths that may also be shown. Further, animation may be applied to differentiate the nodes of path 416 from other nodes, etc.

FIG. 5 also illustrates that the system is capable of generating and displaying a bounding shape 502 surrounding (e.g., encompassing) path 416. Bounding shape 502 may be shown in response to a selection of path 416 directly within region 408 and/or of row 3 in region 406. In one or more embodiments, bounding shape 502 is displayed responsive to selecting path 416 within region 408, selecting row 3 within region 406, hovering over path 416 in region 408, or hovering over row 3 in region 406.

As discussed, the snapshots that are generated can include the convex hull of all critical paths. For example, the system stores each Y-hop driver and load from each pin on each critical path, where "Y" is an integer value such as 1, 2, 3, etc. The value of "Y," for example, may be a preference setting. The system is capable of drawing a bounding shape, e.g., a convex hull, that encompasses the selected path and also each of the Y-hop drivers and loads for pins of the critical path (e.g., path 416 in this case). In one or more embodiments, the system is capable of excluding clock paths from the bounding shapes. Bounding shape 502, for example, provides a clear visualization of how fan-ins and fan-outs of a critical path such as path 416 exert influence to pull the nodes of path 416 apart and affect timing.

Figure 6:
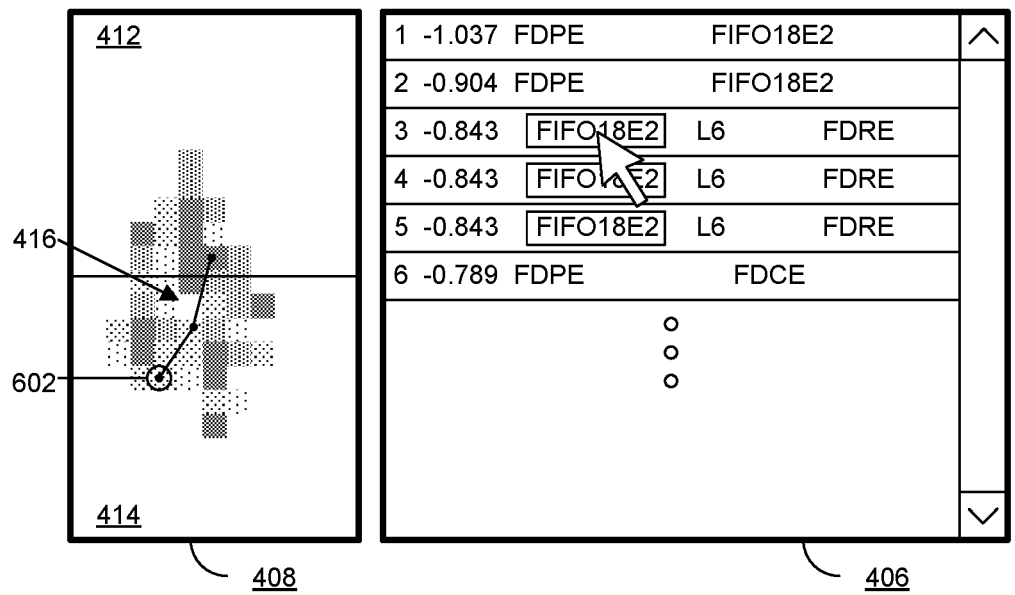
FIG. 6 illustrates regions of the example GUI of FIG. 4 in a different state.

FIG. 6 illustrates regions 406 and 408 of example GUI 400 in a different state. In the example of FIG. 6, a user, using a pointer or other selection mechanism, selects a node within row 3 of region 406. In the example of FIG. 6, in response to the selection (e.g., clicking, hovering, etc.) over the node "FIFO18E2" in row 3, the system is capable of highlighting the selected node in region 408. As pictured, circle 602 may flash or be shown with different coloration to indicate the location of FIFO18E2 within region 408. Thus, by selecting different nodes of a path within a row, e.g., row 3, the location of the different nodes may be seen on the target IC for the current implementation of the circuit design. This allows, for example, a designer to view the exact signal path of a path and observe those nets that are needlessly long, cross die boundaries, etc.

In addition, the system is capable of highlighting the selected node FIFO18E2 in each other critical path in the list in region 406. For example, as pictured, the same node FIFO18E2 appears in the path of row 3, the path of row 4, and the path of row 5. In response to a selection of FIFO18E2 in row 3, the system highlights the same node within other timing critical paths revealing that the selected node is included in three other different critical paths. For example, in response to the user hovering a pointer over FIFO18E2 as shown, the system locates each other critical path including the selected node (circuit element) in region 406 for the currently selected snapshot and highlights the node in such other critical paths (rows 4 and 5).

The system is further capable of highlighting or otherwise visually indicating the selected node within path 416, e.g., using circle 602. In another aspect, the system is capable of visually distinguishing the selected node not only in path 416 in region 408, but also within each other path shown in region 408 that includes the selected node. For example, the system highlights or otherwise visually distinguishes the paths of rows 3, 4, and 5 of region 406 within region 408. Further, the system highlights or otherwise visually distinguishes the selected node "FIFO18E2" within each path shown in region 408 so that the position of the selected node within the three critical paths can be viewed.

In accordance with the inventive arrangements described herein, a user may load timing data for a design flow. By selecting different phases and then selecting different snapshot controls for the phase, the system is able to navigate forward and/or backward in time, snapshot by snapshot, through the various iterations and operations of the design flow. Thus, the system is able to display the particular location within a given phase where a path became critical, where a timing critical path stopped being critical, etc. As the path becomes critical, the path is listed in region 406 and/or shown in 408 for those snapshots that the path is either critical or in the top N critical paths. The path may not be shown in region 408 and/or region 406 for those snapshots where the path is not critical or is not in the top N critical paths.

In one or more embodiments, the system is configured to generate the views shown in GUI 400 by rendering the map in the background on a separate layer. The system is capable of buffering the layer in the background beneath an existing layer that is displayed (e.g., currently displayed). The system is capable of fading out (or away) the existing layer to expose the newly rendered layer when that layer is fully rendered. In an example, the number of rectangles in the map, e.g., when representing configurable logic blocks or other circuit elements or control sets, may be numerous requiring time to render.

In an aspect, the system is capable of then drawing the SLRs, e.g., dies. The system is capable rendering nodes of critical paths as a force-directed graph in region 408, which may be considered a "device view." In an aspect, the system draws edges (e.g., wires connecting circuit elements of the paths) with color coding correlated with a scale ranging from small to large timing violations. For example, gray may be used to represent wires or edges with small timing violations moving on a continuum or scale to red for indicating the most significant or largest timing violations.

The system may then render the view in region 406. For example, event handlers may be coupled with the rows and nodes in the rows to perform UI actions in response to detected inputs such as hover, click, etc. The UI actions, for example, implement the highlighting and/or visual distinguishing discussed herein. The system may also, in response to selection of a path, render the path details (e.g., the timing report for the path) within region 410.

Figures 7, 8:
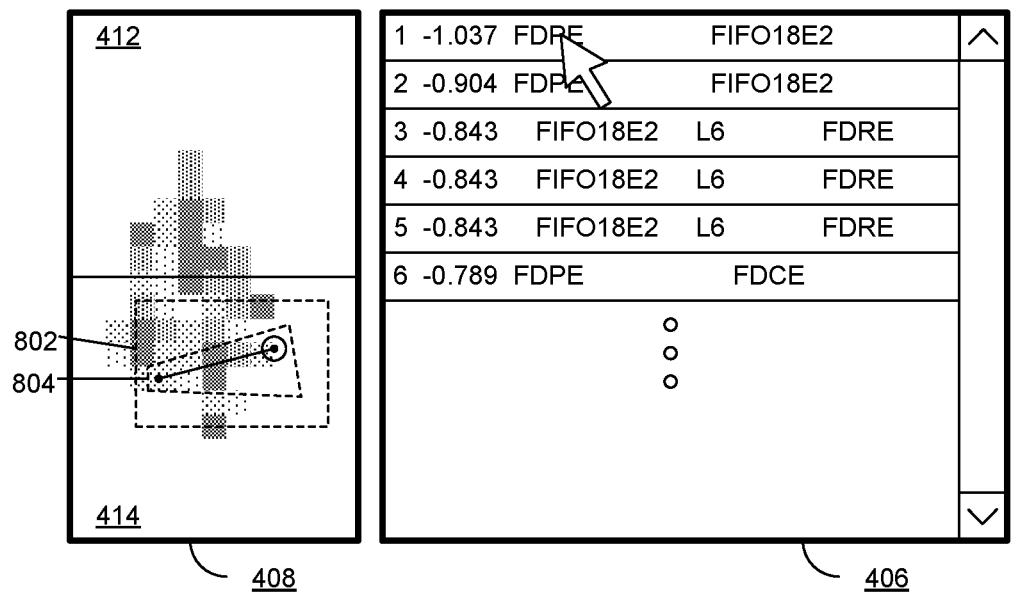
FIG. 7 illustrates example rows of a list of critical paths in a region of the example GUI of FIG. 4.
FIG. 8 illustrates regions of the example GUI of FIG. 4 in a different state.

FIG. 7 illustrates example rows of a list of critical paths in region 406 of GUI 400. FIG. 7 illustrates an example where those paths that appear on the final timing report of a phase may be visually distinguished from other paths that do not appear on the final timing report for the phase. For purposes of illustration, consider an example where the rows shown in FIG. 7 are for a snapshot of the placement phase, where the snapshot is not the last snapshot of the phase. For example, the rows shown in FIG. 3 may be for snapshot 8 of the 18 shown in FIG. 4 for placement. In the example of FIG. 7, row 3 includes a visual indicator 702 at the far left of the row, e.g., to the left of "3".

Visual indicator 702 means that the path represented by of row 3 remains timing critical at the conclusion of placement. For example, referring to FIG. 4, the placement phase includes 18 operations for which snapshots are available. Any paths that are timing critical in snapshot 18 are the timing critical paths included in the final timing report for placement, e.g., the timing critical paths at the end of placement. As the different snapshots of placement such as 4, 5, 6, 12, 15, etc. are selected, any time that the path of row 3 appears in the list of timing critical paths in region 406, the path may be visually distinguished from other paths that, while being timing critical for the particular snapshots being viewed, are not timing critical in snapshot 18 corresponding to the final timing report of placement. The system is capable of comparing paths within displayed snapshots to the final snapshot (e.g., final timing report for the phase) in order to determine which timing critical paths or top N timing critical paths of a given snapshot are also timing critical or within the top N timing critical paths of the final timing report.

In one or more embodiments, color coding may be used to indicate the relative degree of the timing violation. For example, visual indicator 702 may be one color for paths that are within the N most timing critical paths of the final timing report for the phase, while a different color may be used for the N+1 to X paths, where X is the total number of timing critical paths for the snapshot with X>N. It should be appreciated that the timing of the path may change from one snapshot to another so that the location of the path in the list from one snapshot to another may change. In some cases, a path may become timing critical in one snapshot, become non-timing critical in another snapshot or less timing critical, and end up timing critical in the final timing report. As such, the path would be flagged as described as one that is timing critical in the final timing report for the selected phase.

FIG. 8 illustrates regions 406 and 408 of example GUI 400 in a different state. In the example of FIG. 8, a user hovers over node FDRE in row 1. The path represented in row 1 is shown in region 408. In the example of FIG. 8, the node FDRE has an area constraint, e.g., a location or placement constraint. The system is capable of determining whether a selected node has a constraint and, in response to detecting a constraint for the selected node, display the constraint in region 408. Thus, system displays the location constraint as rectangle 802 indicating the allowable area in which the path or a node therein may be located. It should be appreciated, however, that the constraint may be displayed as a shape that encompasses the portion or area of the target IC that is affected by the constraint without regard to using any one particular geometric shape. Bounding shape 804 may also be shown for the selected path.

Figure 9:
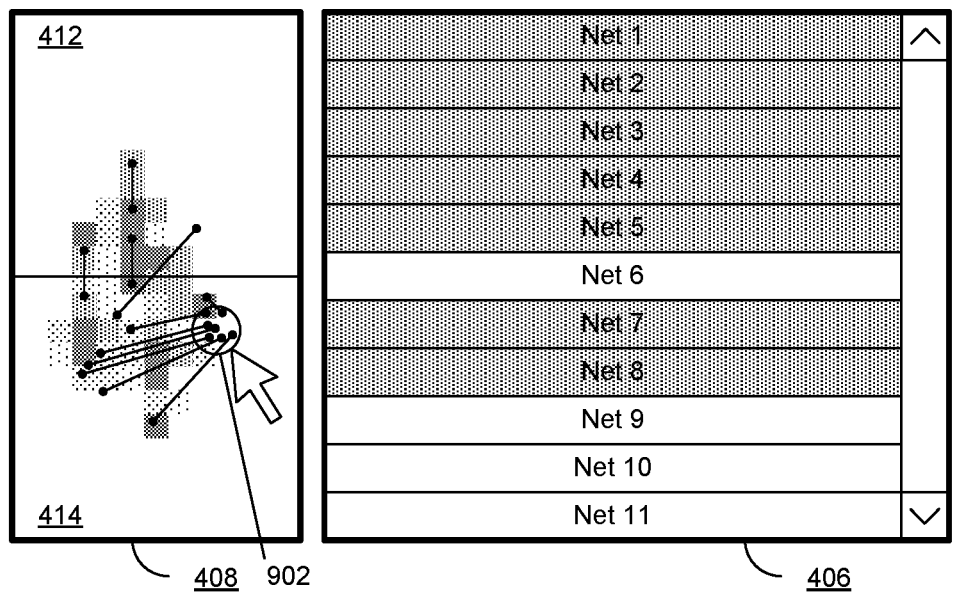
FIG. 9 illustrates regions of the example GUI of FIG. 4 in a different state.

FIG. 9 illustrates regions 406 and 408 of example GUI 400 in a different state. In the example of FIG. 9, a user hovers over a plurality of nodes and/or draws a selection circle (or rectangle) 902 encompassing a plurality of nodes in region 408. In response, the system is capable of highlighting each of the paths in region 406 having a node selected in selection circle 902. Though not illustrated in FIG. 9, the particular node, or nodes, included in selection circle 902 in each of paths 1, 2, 3, 4, 5, 7, and 8 may be highlighted in each respective row, e.g., as illustrated with reference to the highlighted node FIFO18E2 in FIG. 6. Within region 408, the system is capable of visually distinguishing the nodes within selection circle 902 from other nodes external to selection circle 902 within region 408. Further, the particular paths that include a node within selection circle 902 may be visually distinguished from other paths shown in region 408.

In one or more embodiments, a selection within region 406 and/or 408 may remain highlighted as the user selects different snapshots within the same phase or a different phase. For example, consider the case where path 416 is selected (whether by selecting path 416 in region 408 or by selecting row 3 in region 406). In that case, path 416 may remain selected (e.g., highlighted) as the user selects other snapshots to view presuming that the path is still timing critical in such other snapshots. As discussed, the particular placement of the nodes of the path as shown in region 408 may change from one snapshot to another as may the ordering of the selected path in region 406 from one snapshot to another. The ability to track a highlighted path through different snapshots allows one to easily track the processing of the path through the design flow.

While selection of paths is described above in terms of highlighting as different snapshots are traversed, the system is capable of applying a similar technique to selected nodes, where the node remains selected as the user selects different snapshots within the same phase or a different phase of the design flow.

In one or more embodiments, the state of GUI 400 may be specified and preserved as a universal resource identifier such as a universal resource locator (URL). For example, a first user may locate a particular point within the design flow, e.g., snapshot 7 of placement corresponding to operation 7 of placement, as the location where a particular path became timing critical. The first user may save the URL, drag the URL to the desktop, include the URL in a message (instant message or electronic mail, post, etc.), or otherwise provide the URL to a second user responsible for closing timing on the circuit design. The second user may launch or execute the URL to generate the exact state of GUI 400 viewed by the first user to quickly see the issue found by the first user. The second user need not spend time trying to find the particular location found by the first user, sift through enormous amounts of timing data, etc., thereby avoiding duplicative work. From the URL, the system is capable of recalling each aspect of each region of GUI 400, e.g., including selected objects, highlighted objects, etc. in each region.

The following are example use cases and operations performed by a system as described herein. In one aspect, the system is capable of stepping through the snapshots in time order starting at the beginning of a design flow and continuing to the end of the design flow. The state of each snapshot is rendered using GUI 400 as described herein thereby displaying the state of the critical paths and showing how timing criticality of the paths evolves throughout the design flow from one snapshot to another. In an embodiment, the system is capable of stepping through automatically, e.g., in a timed sequence.

In another aspect, the system is capable of stepping through the snapshots of the design flow in the reverse order. For example, the system is capable of stepping through the snapshots in reverse time order. The state of each snapshot is rendered using GUI 400 as described herein thereby displaying the state of the critical paths from one snapshot to another. The system is capable of determining, for example, which snapshot a particular path or paths first became timing critical. In an embodiment, the system is capable of indicating the snapshot a given path first became timing critical. In an embodiment, the system is capable of stepping through automatically, e.g., in a timed sequence.

In another aspect, the system is capable of checking one or more phases of the design flow to verify that the operations of the phases performed as expected. The system is capable of comparing snapshots with one or more metrics to determine whether the state of the circuit design implementation for a given snapshot complies with expectations, per the metrics, for that snapshot. Examples of metrics may include a worst case allowable slack for a given snapshot, a worst case number of timing critical paths for a given snapshot, whether a timing critical path crosses a die boundary, and so forth.

Particular operations, for example, are expected to fix a timing critical path that crosses a die boundary so that the path no longer crosses the die boundary. A timing critical path that crosses a die boundary after a particular operation, e.g., macro placement, is performed indicates that the operation did not perform as expected. In an aspect, this condition indicates a bug. In another aspect, the condition indicates a problem with the circuit design such as an overly restrictive constraint. A similar comparison may be made with regard to whether the number of timing critical paths for a snapshot exceeds a threshold number of timing critical paths and/or whether a timing critical path is more timing critical than expected (as compared to a threshold or expected negative slack). Such conditions indicate that the operation corresponding to the snapshot did not perform as expected. The system is capable of detecting these conditions and indicating which snapshot(s) such conditions exist and/or displaying the particular conditions that violate the metrics.

In another aspect, the system is capable of checking paths for constraints. The system is capable of determining whether the top N critical paths, or the critical paths, of the circuit design are subject to a constraint for different snapshots. In an example, the system is capable of flagging or visually indicating those timing critical paths that are subject to a constraint or a selected constraint such as a global clock constraint, an area constraint, or the like. Further, the system is capable of flagging those timing critical paths that are subject to a constraint and remain critical at the end of a given phase or at the end of the design flow.

In another aspect, the system is capable of analyzing the top N critical paths or the critical paths to identify patterns. For example, the system is capable of determining whether the critical paths or top N critical paths include a particular type of circuit element or circuit block such as a block random access memory (BRAM), etc. In another example, the system is capable of determining whether the top N critical paths or critical paths have a fanout that exceeds a particular threshold fanout. In another example, the system is capable of determining whether the top N critical paths or critical paths cross particular circuit structures such as input/output columns within a die and/or die boundaries (e.g., cross from one die to another in a multi-die IC).

In another aspect, the system is capable of detecting cases where the most, or more, timing critical paths in the earlier phases of the design flow are no longer timing critical at the ending of the design flow. In such cases, the system is capable of listing such paths and indicating that the paths are preventing the system from closing timing on the paths that remain timing critical or become timing critical in the latter or end phase(s) of the design flow.

In one or more embodiments, the system is capable of guiding a user through the various use cases described above. In one or more embodiments, the system is capable of generating a report that indicates the information described above. In one or more embodiments, the system is capable of storing a URL for the various locations, views (e.g., GUI states), and/or datasets in which the system detects the particular issues described above. For example, the report may include explanatory text accompanied by a URL that, when selected, configures GUI 400 to display the issue described in the text next to the URL with relevant paths and/or nodes highlighted.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise. As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. Memory elements, as described herein, are examples of a computer readable storage medium. A non-exhaustive list of more specific examples of a computer readable storage medium may include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

As defined herein, the term "output" means storing in physical memory devices, writing to display or other peripheral output device, sending or transmitting to another system, exporting, or the like. As defined herein, the term "plurality" means two or more than two.

As defined herein, the terms "one embodiment," "an embodiment," "one or more embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," and similar language throughout this disclosure may, but do not necessarily, all refer to the same embodiment.

As defined herein, the term "processor" means at least one hardware circuit configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, a graphics processing unit (GPU), a controller, and so forth.

As defined herein, the term "user" means a human being.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

One or more embodiments are directed to systems and/or apparatus for closing timing for a circuit design. In one aspect, a system includes a display device. The display device displays and/or includes a first region having a plurality of controls corresponding to a plurality of data sets generated at different times during a phase of a design flow for a circuit design, wherein each control selects a data set associated with the control. The display device can display and/or include a second region configured to display a list of critical paths for data sets selected from the first region using one of the plurality of controls. The display device can display and/or include a third region configured to display a representation of a target integrated circuit including layouts for the critical paths of the list for implementations of the circuit design specified by the selected data sets.

In an aspect, the selection of a critical path from the list of critical paths in the second region visually distinguishes the selected critical path from other critical paths of the circuit design in the third region.

In another aspect, the selection of a critical path within the third region visually distinguishes the selected critical path within the list in the second region.

In another aspect, the third region is configured to display a bounding shape for a selected critical path, wherein the bounding shape is defined by locations of nodes of the selected critical path and nodes a predetermined number of hops from each node of the selected critical path.

In another aspect, a state of the first region, the second region, and the third region is saved as a universal resource identifier.

In another aspect, the critical paths in the third region are displayed over a resource utilization map for the target integrated circuit.

In another aspect, the third region is configured to display a shape indicating an area of the target integrated circuit affected by a constraint for a selected critical path.

In another aspect, the list of critical paths includes a plurality of rows, wherein each row corresponds to one critical path from the list, wherein each row specifies nodes of the path where spacing between nodes in the row is proportional to delays of nets of the path defined by the nodes.

In another aspect, the list of critical paths includes a plurality of rows, wherein each row corresponds to one of the critical paths from the list, wherein selection of a node of a critical path visually distinguishes the same node in each other row.

One or more embodiments are directed to computer-implemented methods of closing timing for a circuit design. In one aspect, a method can include displaying, using a display device, a first region having a plurality of controls corresponding to a plurality of data sets generated at different times during a phase of a design flow for a circuit design, wherein each control selects a data set associated with the control, and displaying, using the display device, a second region configured to display a list of critical paths for data sets selected from the first region using one of the plurality of controls. The method can also include displaying, using the display device, a third region configured to display a representation of a target integrated circuit including layouts for the critical paths of the list for implementations of the circuit design specified by the selected data sets.

In an aspect, the selection of a critical path from the list of critical paths in the second region visually distinguishes the selected critical path from other critical paths of the circuit design in the third region.

In another aspect, the selection of a critical path within the third region visually distinguishes the selected critical path within the list in the second region.

In another aspect, the third region is configured to display a bounding shape for a selected critical path, wherein the bounding shape is defined by locations of nodes of the path and nodes a predetermined number of hops from each node of the selected critical path.

In another aspect, a state of the first region, the second region, and the third region is saved as a universal resource identifier.

In another aspect, the critical paths in the third region are displayed over a resource utilization map for the target integrated circuit.

In another aspect, the third region is configured to display a shape indicating an area of the target integrated circuit affected by a constraint for a selected critical path.

In another aspect, the list of critical paths includes a plurality of rows, wherein each row corresponds to one critical path from the list, wherein each row specifies nodes of the path where spacing between nodes in the row is proportional to delays of nets of the path defined by the nodes.

In another aspect, the list of critical paths includes a plurality of rows, wherein each row corresponds to one of the critical paths from the list, wherein selection of a node of a critical path visually distinguishes the same node in each other row.

One or more embodiments are directed to computer program products for closing timing of a circuit design. In one aspect, a computer program product includes a computer readable storage medium having program code stored thereon. The program code is executable by a processor to perform operations including displaying, using a display device, a first region having a plurality of controls corresponding to a plurality of data sets generated at different times during a phase of a design flow for a circuit design, wherein each control selects a data set associated with the control, and displaying, using the display device, a second region configured to display a list of critical paths for data sets selected from the first region using one of the plurality of controls. The program code is further executable by the processor to perform operations including displaying, using the display device, a third region configured to display a representation of a target integrated circuit including layouts for the critical paths of the list for implementations of the circuit design specified by the selected data sets.

In an aspect, the selection of a critical path from the list of critical paths in the second region visually distinguishes the selected critical path from other critical paths of the circuit design in the third region.

In another aspect, the selection of a critical path within the third region visually distinguishes the selected critical path within the list in the second region.

In another aspect, the third region is configured to display a bounding shape for a selected critical path, wherein the bounding shape is defined by locations of nodes of the path and nodes a predetermined number of hops from each node of the selected critical path.

In another aspect, a state of the first region, the second region, and the third region is saved as a universal resource identifier.

In another aspect, the critical paths in the third region are displayed over a resource utilization map for the target integrated circuit.

In another aspect, the third region is configured to display a shape indicating an area of the target integrated circuit affected by a constraint for a selected critical path.

In another aspect, the list of critical paths includes a plurality of rows, wherein each row corresponds to one critical path from the list, wherein each row specifies nodes of the path where spacing between nodes in the row is proportional to delays of nets of the path defined by the nodes.

In another aspect, the list of critical paths includes a plurality of rows, wherein each row corresponds to one of the critical paths from the list, wherein selection of a node of a critical path visually distinguishes the same node in each other row.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A system for closing timing for a circuit design, comprising:
   a processor configured to perform a design flow on a circuit design and generate a plurality of data sets corresponding to implementation states at different times during a phase of the design flow, wherein the circuit design is configured for implementation within an integrated circuit; and
   a display device including:
   a first region having a plurality of controls corresponding to the plurality of data sets, wherein each control selects the data set associated with the control;
   a second region configured to display a list of critical paths for data sets selected from the first region using one of the plurality of controls, wherein the critical paths are timing critical and determined using the processor; and
   a third region configured to display a representation of a target integrated circuit including layouts for the critical paths of the list for the implementation states of the circuit design specified by the selected data sets;
   wherein the display is configured to illustrate evolution of the critical paths within the second region and the third region through the phase of the design flow responsive to selection of different ones of the plurality of controls.

2. The system of claim 1, wherein selection of a critical path from the list of critical paths in the second region visually distinguishes the selected critical path from other critical paths of the circuit design in the third region.

3. The system of claim 1, wherein selection of a critical path within the third region visually distinguishes the selected critical path within the list in the second region.

4. The system of claim 1, wherein the third region is configured to display a bounding shape for a selected critical path, wherein the bounding shape is defined by locations of nodes of the selected critical path and nodes a predetermined number of hops from each node of the selected critical path.

5. The system of claim 1, wherein a state of the first region, the second region, and the third region is saved as a universal resource identifier.

6. The system of claim 1, wherein the critical paths in the third region are displayed over a resource utilization map for the target integrated circuit.

7. The system of claim 1, wherein the third region is configured to display a shape indicating an area of the target integrated circuit affected by a constraint for a selected critical path.

8. The system of claim 1, wherein the list of critical paths includes a plurality of rows, wherein each row corresponds to one critical path from the list, wherein each row specifies nodes of the path where spacing between nodes in the row is proportional to delays of nets of the path defined by the nodes.

9. The system of claim 1, wherein the list of critical paths includes a plurality of rows, wherein each row corresponds to one of the critical paths from the list, wherein selection of a node of a critical path visually distinguishes the same node in each other row.

10. The system of claim 1, wherein one of the plurality of data sets is loaded into memory and is viewable within the second region and the third region at a time.

11. A computer-implemented method for closing timing for a circuit design, comprising:
    performing, using a processor, a design flow on a circuit design and generating a plurality of data sets corresponding to implementation states at different times during a phase of the design flow, wherein the circuit design is configured for implementation within an integrated circuit;
    displaying, using a display device, a first region having a plurality of controls corresponding to the plurality of data sets, wherein each control selects the data set associated with the control;
    displaying, using the display device, a second region configured to display a list of critical paths for data sets selected from the first region using one of the plurality of controls, wherein the critical paths are timing critical and determined using the processor;
    displaying, using the display device, a third region configured to display a representation of a target integrated circuit including layouts for the critical paths of the list for the implementation states of the circuit design specified by the selected data sets; and illustrating evolution of the critical paths within the second region and the third region through the phase of the design flow responsive to selection of different ones of the plurality of controls.

12. The method of claim 11, wherein:

selection of a critical path from the list of critical paths in the second region visually distinguishes the selected critical path from other critical paths of the circuit design in the third region; and selection of a critical path within the third region visually distinguishes the selected critical path within the list in the second region.

13. The method of claim 11, wherein the third region is configured to display a bounding shape for a selected critical path, wherein the bounding shape is defined by locations of nodes of the path and nodes a predetermined number of hops from each node of the selected critical path.

14. The method of claim 11, wherein a state of the first region, the second region, and the third region is saved as a universal resource identifier.

15. The method of claim 11, wherein the critical paths in the third region are displayed over a resource utilization map for the target integrated circuit.

16. The method of claim 11, wherein the third region is configured to display a shape indicating an area of the target integrated circuit affected by a constraint for a selected critical path.

17. The method of claim 11, wherein the list of critical paths includes a plurality of rows, wherein each row corresponds to one critical path from the list, wherein each row specifies nodes of the path where spacing between nodes in the row is proportional to delays of nets of the path defined by the nodes.

18. The method of claim 11, wherein the list of critical paths includes a plurality of rows, wherein each row corresponds to one of the critical paths from the list, wherein selection of a node of a critical path visually distinguishes the same node in each other row.

19. A computer program product comprising a computer readable storage medium having program code stored thereon for closing timing for a circuit design, the program code executable by a processor to perform operations comprising:

performing, using the processor, a design flow on a circuit design and generating a plurality of data sets corresponding to implementation states at different times during a phase of the design flow, wherein the circuit design is configured for implementation within an integrated circuit;

displaying, using a display device, a first region having a plurality of controls corresponding to the plurality of data sets, wherein each control selects a data set associated with the control;

displaying, using the display device, a second region configured to display a list of critical paths for data sets selected from the first region using one of the plurality of controls, wherein the critical paths are timing critical and determined using the processor;

displaying, using the display device, a third region configured to display a representation of a target integrated circuit including layouts for the critical paths of the list for the implementation states of the circuit design specified by the selected data sets; and illustrating evolution of the critical paths within the second region and the third region through the phase of the design flow responsive to selection of different ones of the plurality of controls.

20. The computer program product of claim 19, wherein:

selection of a particular critical path from the list of critical paths in the second region visually distinguishes the particular critical path from other critical paths of the circuit design in the third region; and selection of the particular critical path within the third region visually distinguishes the particular critical path within the list in the second region.

* * * * *